G. GREER & M. CARNEY.
MEANS FOR REGULATING THE TENSION ON THE DRIVING BELTS OF MOTOR CYCLES AND THE LIKE.
APPLICATION FILED JUNE 30, 1914.
1,141,539. Patented June 1, 1915.
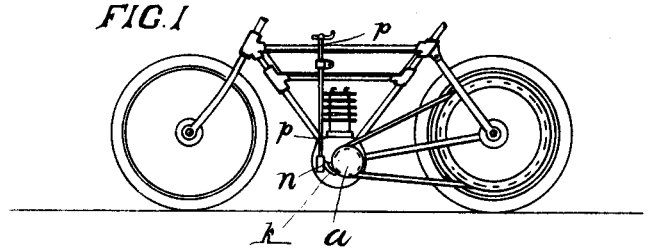
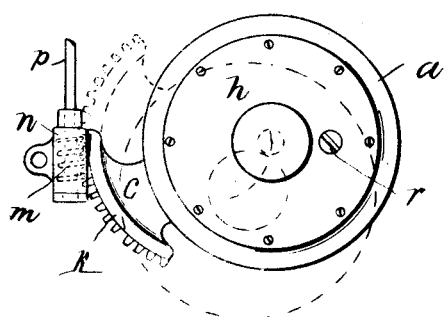
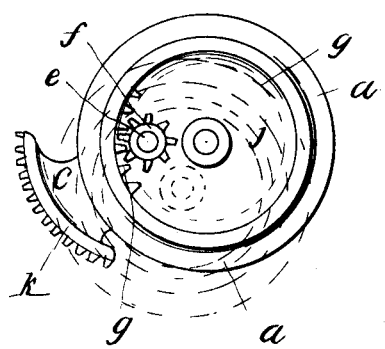
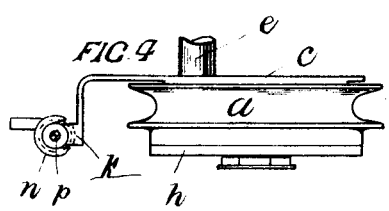
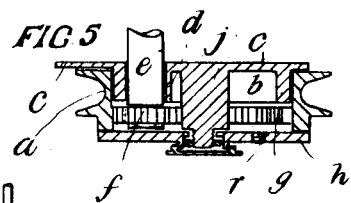
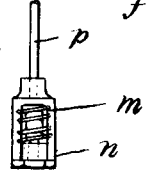
WITNESSES
INVENTORS
GEORGE GREER AND MARTIN CARNEY
BY
ATTORNEY

UNITED STATES PATENT OFFICE.

GEORGE GREER AND MARTIN CARNEY, OF FITZHERBERT WEST, PALMERSTON NORTH, NEW ZEALAND.

MEANS FOR REGULATING THE TENSION ON THE DRIVING-BELTS OF MOTOR-CYCLES AND THE LIKE.

1,141,539.  Specification of Letters Patent.  Patented June 1, 1915.

Application filed June 30, 1914. Serial No. 848,158.

*To all whom it may concern:*

Be it known that we, GEORGE GREER and MARTIN CARNEY, subjects of the King of Great Britain, residing at Fitzherbert West, Palmerston North, New Zealand, have invented a new and useful Improved Means for Regulating the Tension on the Driving-Belts of Motor-Cycles and the like; and we do hereby declare the following to be a full, clear, and exact description of the same.

This invention has been devised in order to provide means whereby the tension on the driving belts of motor cycles may be regulated at will by the person riding the cycle and without any necessity of dismounting or stopping the cycle. The belt may thus be slackened or tightened whenever required during the running of the machine.

The invention consists broadly in mounting the driving pulley eccentrically upon the engine shaft or driving shaft as the case may be so that when turned on the axis of such shaft it may be moved away from or toward the back wheel pulley and thereby tighten or loosen the driving belt connecting the two pulleys.

It also consists in the special means adapted for mounting and gearing the driving pulley with the driving shaft and for swinging the pulley on such shaft, all of which will be fully explained with reference to the accompanying drawings, in which:—

Figure 1 is an elevation of a motor cycle showing the arrangement of the invention thereon. Fig. 2 is a side elevation of the driving pulley and its parts on an enlarged scale. Fig. 3 is a similar view with the front cover removed. Fig. 4 is a plan, and Fig. 5 a sectional plan thereof. Fig. 6 is a face view of a detail that will be hereinafter fully described.

In the construction shown the driving pulley $a$ is formed by a ring having the usual belt groove in its periphery, or sprockets formed thereon if intended for chain driving. The ring is mounted upon a flange $b$ extending from the front face of a circular plate $c$ so as to be free to run on such flange. This plate is also provided with a bearing $d$ in which the engine shaft $e$ is journaled such bearing being arranged to one side of the center of the plate and the pulley ring $a$. Consequently the plate and ring may be turned on the shaft $e$ and thereby caused to assume variable positions. A pinion $f$ is secured upon the end of the shaft $e$ and arranged within the pulley ring, and teeth $g$ are formed around the inside surface of the ring, with which teeth the pinion gears so as to rotate the ring upon the flange $b$ when the engine is driven. The requisite rotation for the pulley is thus obtained and the pinion remains in gear no matter to what position the carrying plate $e$ is swung around the shaft.

A cover plate $h$ is screwed on the outside of the ring $a$ and incloses the parts within the ring. A central pillar $j$ is arranged to extend forwardly from the plate $c$ and the cover $h$ passes over this pillar and is held thereon by means of suitable lock nuts which therefore hold the pulley and its parts upon the plate $c$ and allow of it rotating freely thereon.

The plate $c$ and the pulley are supported by the engine shaft and means are provided whereby the plate is retained in its desired position and may, whenever required, be moved eccentrically upon the shaft. These means consist of a toothed quadrant $k$ that is fixed to one edge of the plate and the line of which is made concentric with the engine shaft. A worm wheel $m$ is provided and adapted to gear with this quadrant and such worm wheel is carried within a sleeve $n$ that is fastened to any approved fixture on the engine or machine, a portion of the sleeve being broken away so as to expose the worm wheel, as shown in Fig. 6, and allow of it gearing with the quadrant. This engagement of the worm wheel with the quadrant consequently retains the quadrant and plate $c$ in the position required, while by rotating the worm wheel the quadrant may be moved up or down and the plate positioned to move the pulley away from or toward the back wheel pulley of the machine. The worm wheel is mounted on the bottom end of a rod spindle $p$ that is carried up and held in suitable guide bearings so that its upper end shall be situated conveniently for turning by a rider on the machine as shown in Fig. 1. Consequently the worm wheel may be operated and the tension of the driving belt adjusted by the rider while riding the machine.

The space within the pulley may be filled with lubricant through the hole $r$ in the cover plate provided for that purpose and kept closed by a screw.

What we do claim as our invention, and desire to secure as Letters Patent is:—

1. Means for the purpose described consisting of a driving shaft, a circular plate eccentrically journaled upon the driving shaft and having a flange concentric with the plate, a pulley ring mounted on such flange and formed with gear teeth around its internal periphery, a pinion upon the end of the inner shaft gearing with such teeth, means whereby the pulley ring is retained upon the plate and means whereby the plate may be turned upon its eccentric journal, substantially as specified.

2. Means for the purpose described consisting, in combination with a motor cycle having a driving shaft, of a circular plate eccentrically journaled upon the driving shaft, a toothed quadrant upon one edge of the plate, a fixture upon the motor cycle, a worm wheel gearing with a quadrant and mounted to rotate within said fixture, a rod spindle for operating such worm wheel, and a driving pulley mounted to rotate concentrically upon the plate and geared with the driving shaft, substantially as specified.

In testimony whereof, we have signed this specification in the presence of two subscribing witnesses.

GEORGE GREER.
MARTIN CARNEY.

Witnesses:
F. J. OAKLEY,
J. W. CARNEY